United States Patent [19]

Ogasawara

[11] Patent Number: 4,858,236
[45] Date of Patent: Aug. 15, 1989

[54] METHOD FOR ERROR CORRECTION IN MEMORY SYSTEM

[75] Inventor: Koichi Ogasawara, Kanagawa, Japan

[73] Assignee: Mitsubishi Denki Kabushiki Kaisha, Tokyo, Japan

[21] Appl. No.: 41,785

[22] Filed: Apr. 23, 1987

[30] Foreign Application Priority Data

Apr. 25, 1986 [JP] Japan ................................ 61-96332

[51] Int. Cl.$^4$ ........................................... G06F 11/10
[52] U.S. Cl. ........................................ 371/38; 371/39
[58] Field of Search ..................... 371/37, 38, 39, 40

[56] References Cited

U.S. PATENT DOCUMENTS

| | | | |
|---|---|---|---|
| 4,561,095 | 12/1985 | Khan | 371/38 |
| 4,646,301 | 2/1987 | Okamoto | 371/38 |
| 4,672,614 | 6/1987 | Yoshida | 371/38 |
| 4,689,792 | 8/1987 | Traynor | 371/38 |
| 4,694,454 | 9/1987 | Matsuura | 371/38 |
| 4,706,249 | 11/1987 | Nakagawa | 371/38 |
| 4,712,216 | 12/1987 | Glaise | 371/38 |

*Primary Examiner*—Michael R. Fleming
*Attorney, Agent, or Firm*—Wolf, Greenfield & Sacks

[57] ABSTRACT

An error detection and correction method in an error detection and correction system using an error check code is disclosed, which decides whether a bit error exists in the data portion or in the check code portion in a read out data, and if the bit error exists in the check code portion, it outputs the data portion as it is and if a correctable bit error exists in the data portion, it outputs after correction and recheck, thereby increasing efficiency and reliability of memory system.

15 Claims, 11 Drawing Sheets

SYNDROME DECODE TO BIT-IN-ERROR

| SYNDROME BITS | | | | S16 | 0 | 1 | 0 | 1 | 0 | 1 | 0 | 1 |
|---|---|---|---|---|---|---|---|---|---|---|---|---|
| | | | | S8 | 0 | 0 | 1 | 1 | 0 | 0 | 1 | 1 |
| | | | | S4 | 0 | 0 | 0 | 0 | 1 | 1 | 1 | 1 |
| SX | S0 | S1 | S2 | | | | | | | | | |
| 0 | 0 | 0 | 0 | | X | C16 | C8 | T | C4 | T | T | 30 |
| 0 | 0 | 0 | 1 | | C2 | T | T | 27 | T | 5 | M | T |
| 0 | 0 | 1 | 0 | | C1 | T | T | 25 | T | 3 | 15 | T |
| 0 | 0 | 1 | 1 | | T | M | 13 | T | 23 | T | T | M |
| 0 | 1 | 0 | 0 | | C0 | T | T | 24 | T | 2 | M | T |
| 0 | 1 | 0 | 1 | | T | 1 | 12 | T | 22 | T | T | M |
| 0 | 1 | 1 | 0 | | T | M | 10 | T | 20 | T | T | M |
| 0 | 1 | 1 | 1 | | 16 | T | T | M | T | M | M | T |
| 1 | 0 | 0 | 0 | | CX | T | T | M | T | M | 14 | T |
| 1 | 0 | 0 | 1 | | T | M | 11 | T | 21 | T | T | M |
| 1 | 0 | 1 | 0 | | T | M | 9 | T | 19 | T | T | 31 |
| 1 | 0 | 1 | 1 | | M | T | T | 29 | T | 7 | M | T |
| 1 | 1 | 0 | 0 | | T | M | 8 | T | 18 | T | T | M |
| 1 | 1 | 0 | 1 | | 17 | T | T | 28 | T | 6 | M | T |
| 1 | 1 | 1 | 0 | | M | T | T | 26 | T | 4 | M | T |
| 1 | 1 | 1 | 1 | | T | 0 | M | T | M | T | T | M |

X - NO ERRORS DETECTED
NUMBER - NUMBER OF THE SINGLE BIT-IN-ERROR
T - TWO ERRORS DETECTED
M - THREE OR MORE ERRORS DETECTED

Fig. 7(a)

32-BIT MODIFIED HAMMING CODE-CHECK BIT ENCODE CHART

Fig. 7(b)

METHOD FOR ERROR CORRECTION IN MEMORY SYSTEM

BACKGROUND OF THE INVENTION

The present invention relates to a method for correcting an error in the data read out from a memory unit.

Generally, when data is written into a memory unit, redundancy bits are added to the data bits to be written and the data bits having a redundancy bits are then written, and a bit error in the data which was read out of the memory unit is detected or corrected on the basis of the redundancy bits.

In many cases, the added redundancy bits (i.e., check bits) can correct a single bit error and cannot correct a double or more bit error but can detect the presence of the double or more bit error. Therefore, an explanation will be made hereinbelow on the assumption of such a case. However, the present invention is not limited to only the above case.

Figure 3:
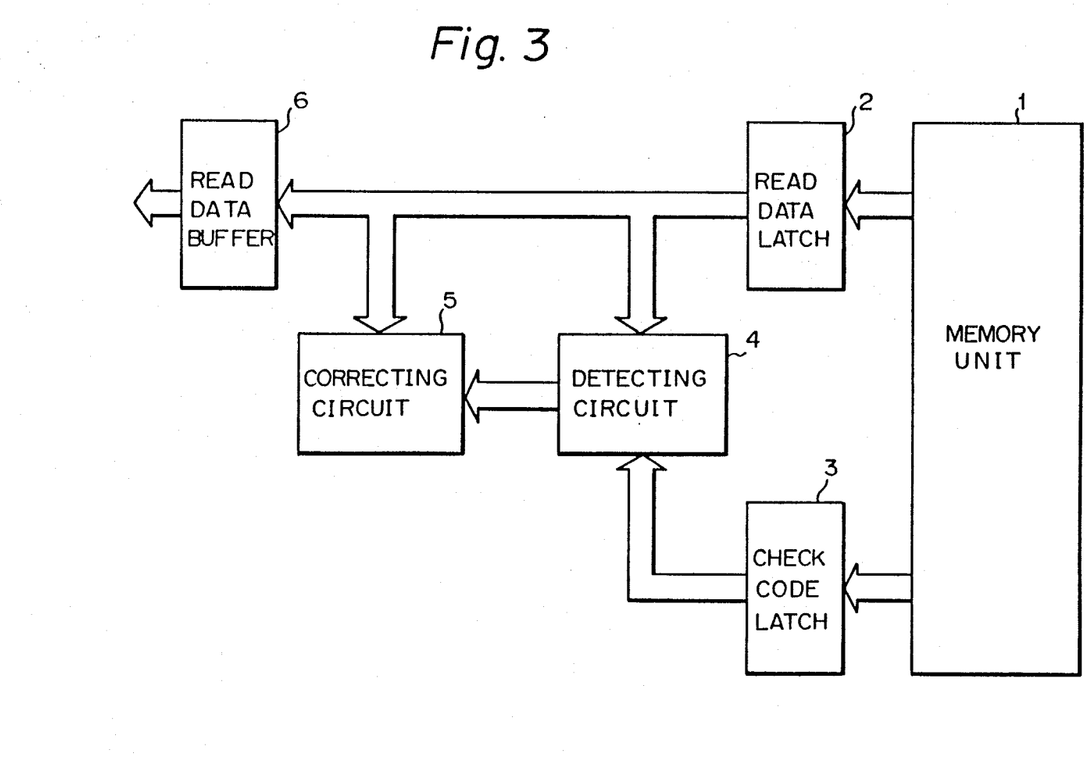
FIG. 3 is a block diagram of a conventional method.

FIG. 3 is a block diagram of a conventional method. In the diagram, reference numerals 1, 2, 3, 4, 5 and 6 denote a memory unit, a read data latch, a check code latch, a detecting circuit, a correcting circuit and a read data buffer, respectively.

Where the memory unit 1 is constructed with, for example, an conventional 64K Bytes Dynamic RAM, the read data latch 2 and the check code latch 3 are constructed with F373 produced by Fairchild Industries, Inc., the read data buffer 6 is constructed with F374 produced by Fairchild Industries, Inc. and the detecting circuit 4 and the correcting circuit 5 are constructed with Am2960, in which the circuits 4 and 5 are implemented together, produced by Advanced Micro Devices, Inc. (AMD).

The operation will now be described. A check code together with data has previously been written in the memory unit 1. The data portion in the content which was read out of the memory unit 1 is temporarily stored into the read data latch 2, while the check code portion is temporarily stored into the check code latch 3.

The contents of the read data latch 2 and of the check code latch 3 are checked by the detecting circuit 4 to thereby determine whether a bit error exists or not. If no error is detected, the content of the read data latch 2 is written into the read data buffer 6. If a bit error is detected by the detecting circuit 4 and it is decided that this bit error is correctable, the information indicative of the position of the error bit is outputted from the detecting circuit 4. The data whose bit error was corrected by the correcting circuit 5 is produced and this correct data is written into the read data buffer 6.

In this case, according to the conventional method, even when a bit error exists in the content of the check code latch 3 and no error is included in the content of the read data latch 2, the detecting circuit 4 regards that the data has a bit error and performs the processes, so that the data is written into the read data buffer 6 through the correcting circuit 5. Namely, in spite of the fact that there is no need to correct the content of the read data latch 2, it is transmitted through the correcting circuit 5 and then written into the read data buffer 6. On the other hand, if an uncorrectable bit error is detected by the detecting circuit 4, an error signal is outputted and the processing routine is terminated as an abnormal termination.

Figure 4:
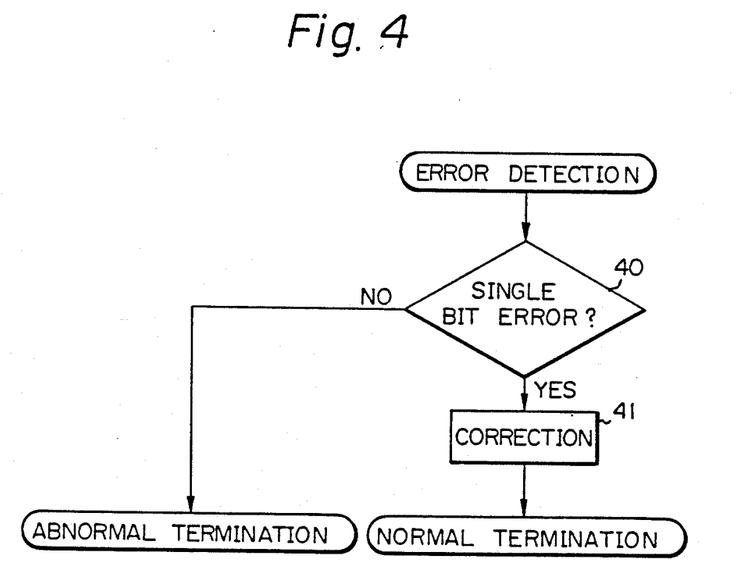
FIG. 4 is a flowchart of the operation in the system of FIG. 3.

FIG. 4 is a flowchart of the operation of the system of FIG. 3. Numerals 40 and 41 represent respective processing steps.

As described above, according to the conventional method, even when no error bit exists in the data, if an error is detected in the check bits, the vain operation such that the data is outputted through the correcting circuit is executed and at the same time, there is a problem such that the data corrected by the correcting circuit is outputted without being rechecked.

SUMMARY OF THE INVENTION

The present invention is made to solve the foregoing problems and it is an object of the invention to provide an error correcting method whereby when no error exists in the data bits, the data is outputted as it is, and the data corrected by the correcting circuit is rechecked and then outputted.

According to the present invention, there is provided an analyzing circuit for analyzing the information (hereinafter, referred to as a syndrome) indicative of the error bit position which is outputted from the detecting circuit when a correctable bit error was detected. When the error bit position does not exist in the data bits, the data bits are outputted as they are and when the error bit position exists in the data bits, the data bits are corrected by the correcting circuit and rechecked and thereafter, the correct data is outputted.

Since the fact that a correctable bit error exists in the data bits denotes that the content of the check code latch 3 is the correct check code, the corrected data bits can be easily rechecked by use of the correct check code.

According to the invention, since the error corrected data can be rechecked in this manner, there are such effects that the reliability of the memory system is improved and a failure of the error detecting circuit or correcting circuit can be easily found out.

DETAILED DESCRIPTION OF THE INVENTION

Figure 1:
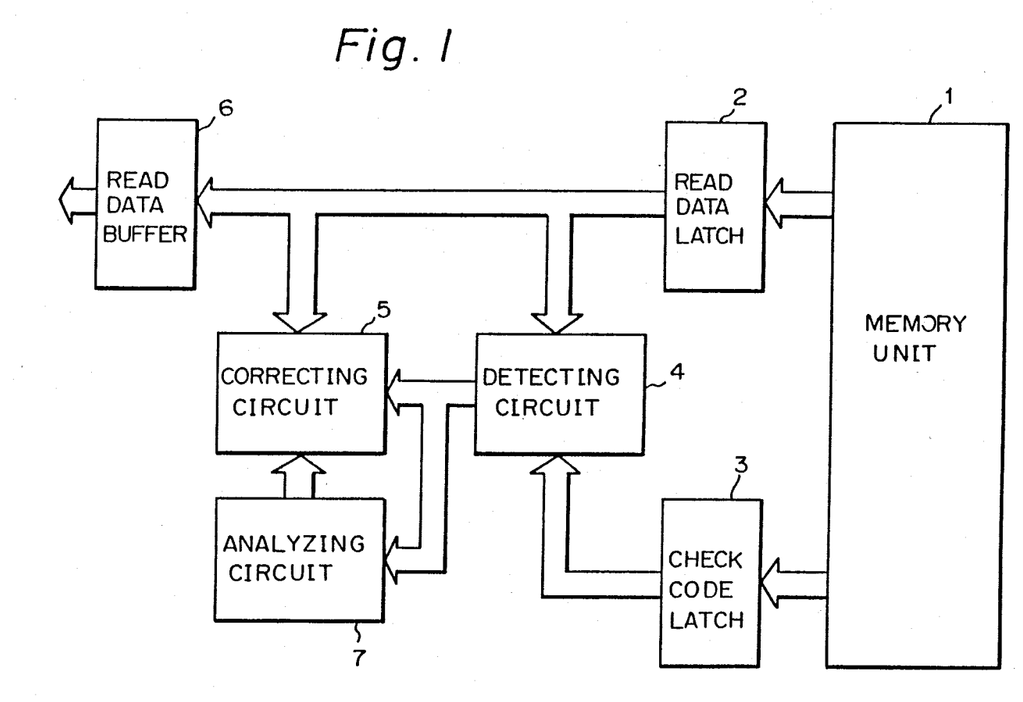
FIG. 1 is a block diagram of an embodiment of the present invention.

An embodiment of the present invention will be described hereinbelow with reference to the drawings. FIG. 1 is a block diagram of an embodiment of the invention. In the diagram, the same or corresponding parts and components as those shown in FIG. 3 are designated by the same reference numerals. Numeral 7 denotes an analyzing circuit to analyze a syndrome.

Figure 2:
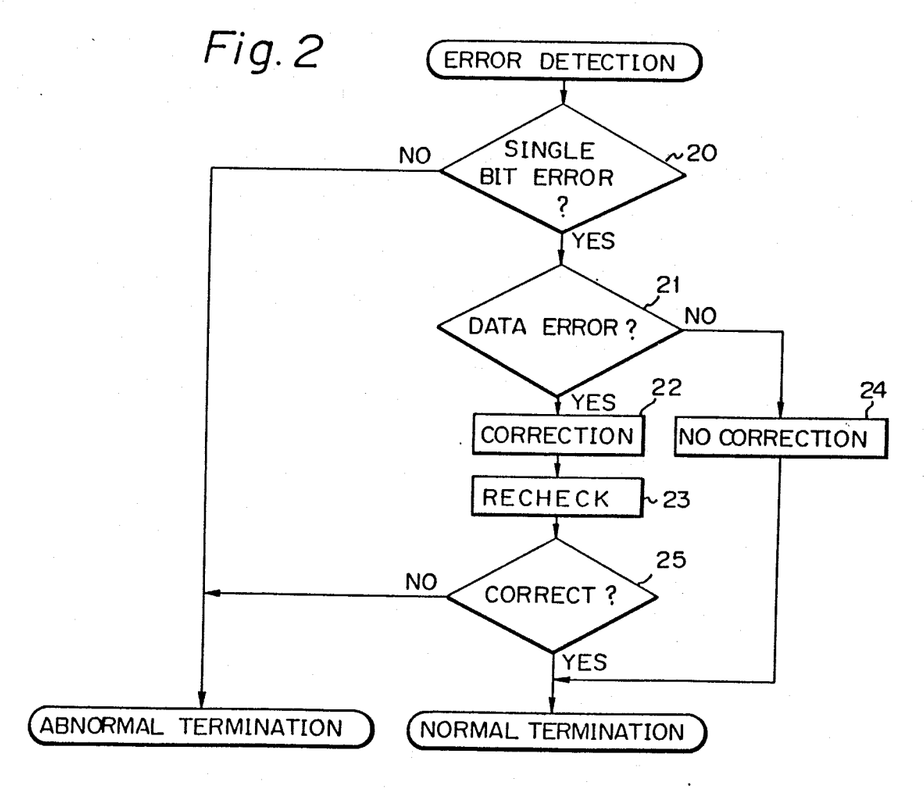
FIG. 2 is a flowchart of the operation in the system in FIG. 1.

FIG. 2 is a flowchart of the operation of the system of FIG. 1. Numerals 20 to 25 indicate processing steps. The operation of the system of FIG. 1 will now be described hereinafter with reference to FIG. 2. Step 20 corresponds to step 40 in FIG. 4. If it is determined in step 20 that a correctable error exists in data, information indicative of the bit number of the error bit is outputted as a syndrome to the analyzing circuit 7 from the detecting circuit 4. In step 21, the analyzing circuit 7 determines whether the error bit exists in the data or in the check code. If no error is included in the data bits, step 24 follows and the content of the read data latch 2 is directly written into the read data buffer 6.

If YES in the decision step 21, the bit in the data which is indicated by the syndrome are corrected in step 22. The corrected data are then rechecked by the content of the check code latch 3 in step 23. If it is determined that no error is detected as the result of the recheck, the processing routine is terminated as a normal termination. If an error is detected as the result of the recheck, the processing routine is terminated as an abnormal termination.

The signal flow according to the operation mentioned above will now be described by referring to FIGS. 5(a) to 5(e).

1. Reading and Checking Data

Figure 5A:
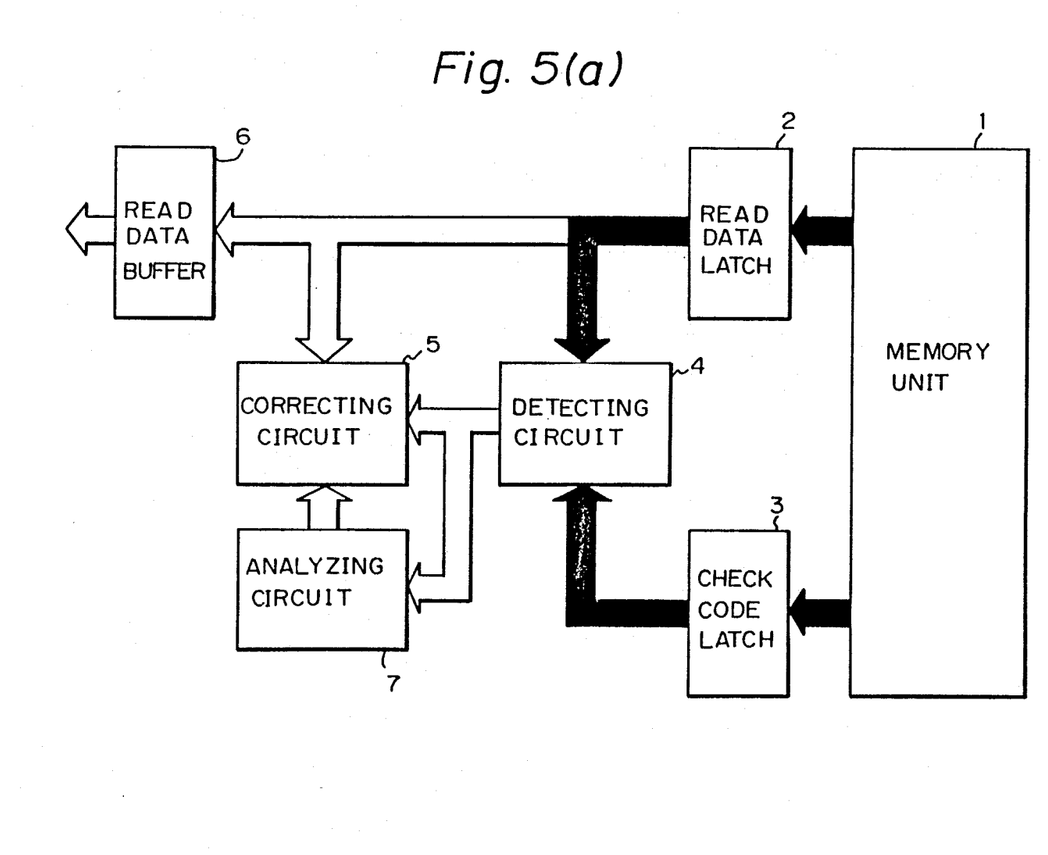
FIGS. 5(a) to 5(e) are block diagrams for explaining the signal flow of the embodiment shown in FIG. 1.

The data and check code read from the memory unit are latched into the latches 2 and 3 shown in FIG. 5(a), respectively and the data latched in the latch 2 is checked by the detecting circuit 4.

2. In case an error is detected

Figure 5B:
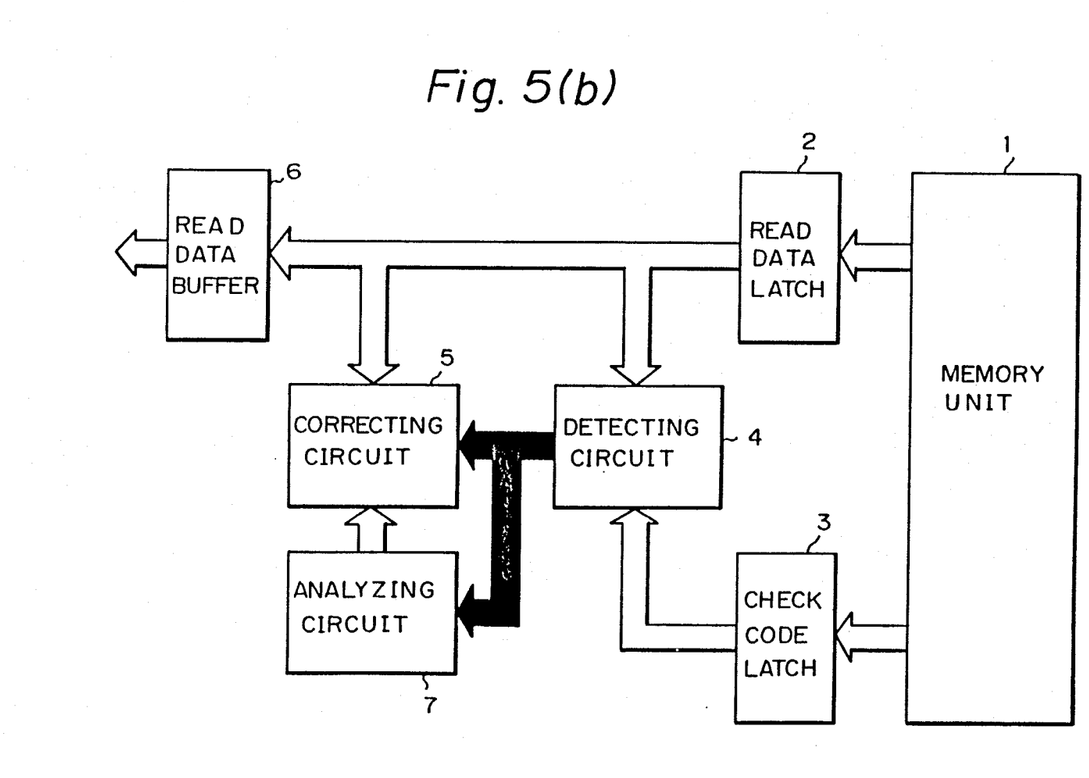

When a single bit error is detected by the detecting circuit 4 shown in FIG. 5(b), information (syndrome) indicating where the error bit is in the data including the check code is sent to the correcting circuit 5 and the analyzing circuit 7 shown in FIG. 5(b).

In the embodiment, the data is 32 bits width and the check code and the syndrome are 7 bits width. The detecting circuit and the correcting circuit are constructed with the LSI Am2960 (Error Detection and Correction Circuit) and the analyzing circuit is constructed by a Programable Array Logic Circuit (PAL).

3. Analysis of Syndrome

Figure 5C:
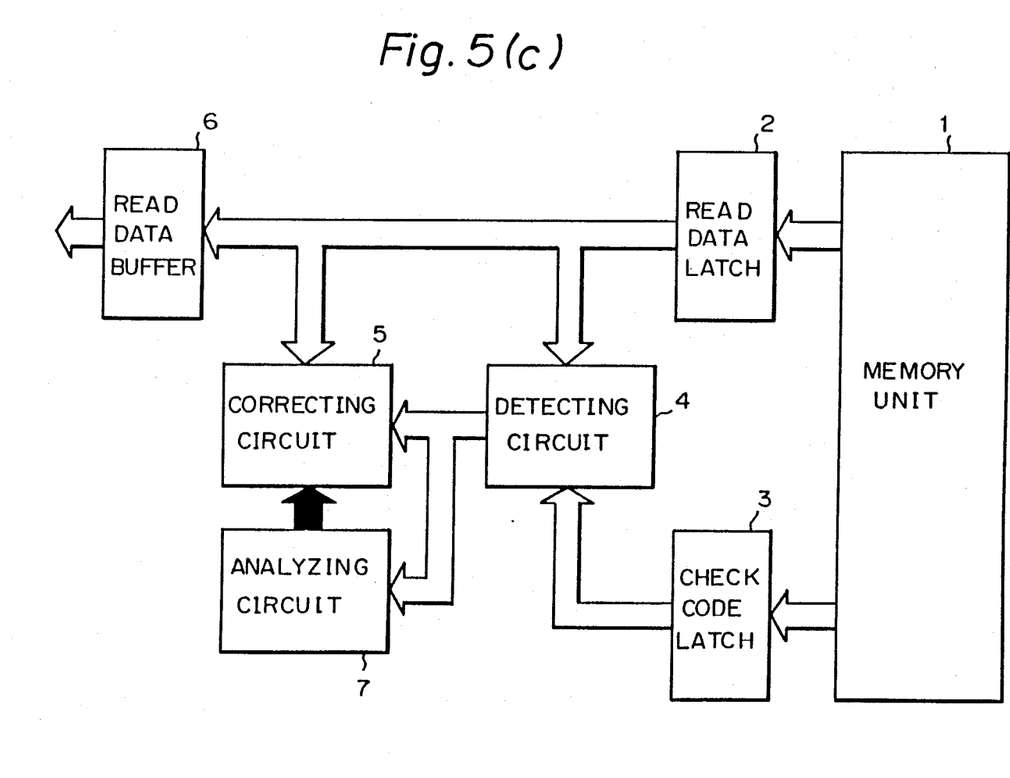
Figure 6:
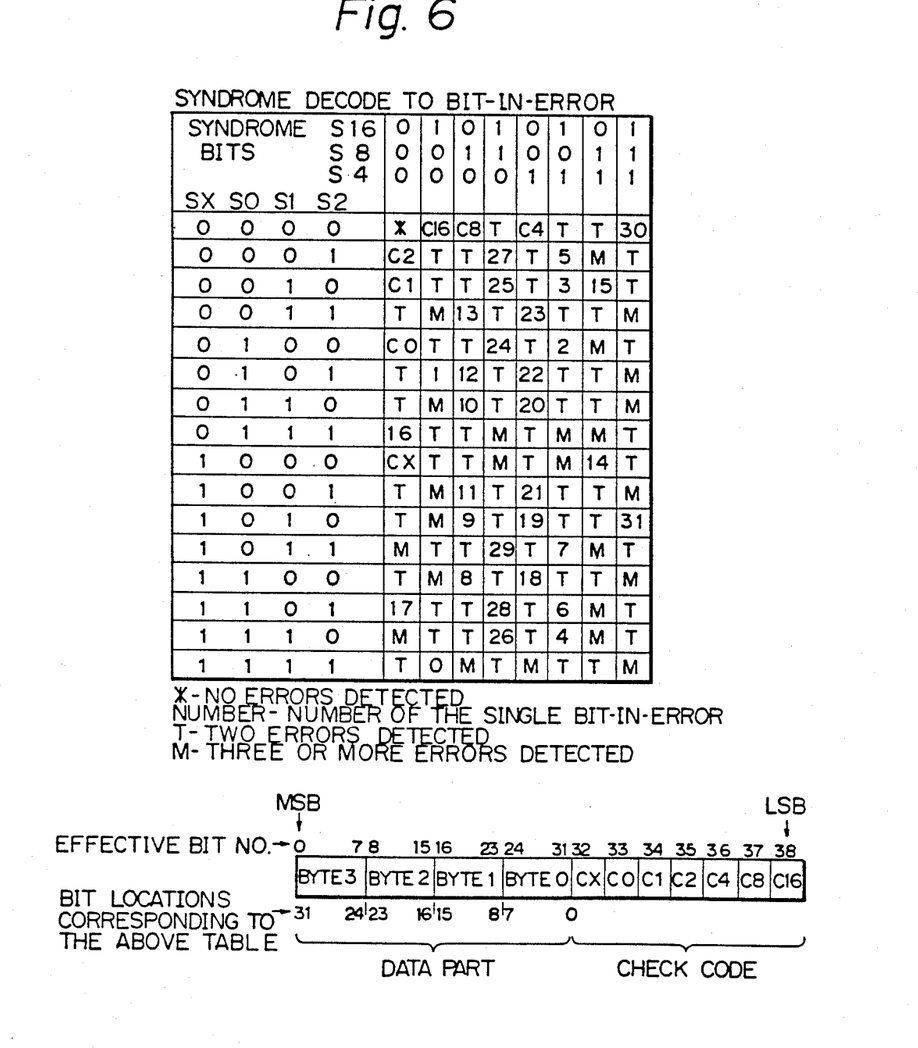
FIG. 6 is a table indicating the relationship between the syndrome and the error bit.

The syndrome sent from the detecting circuit 4 is analyzed by the analyzing circuit 7 shown in FIG. 5(c). Since the syndrome indicates whether the error is a single bit error or a multi-bit error and when the error is a single bit error, where the single bit error is, it can be easily known the single bit error is in the data part or in the check code part. (An example of check codes for 32 bits data is shown in FIG. 6.)

The analyzing circuit 7 analyzes whether the single bit error is in the data part or in the check code part, and in accordance with the result, controls the correcting circuit 5 for controlling the data flow among the correcting circuit 5, the read data latch 2 and the read data buffer 6.

In the embodiment, the decision whether the error is a single bit error or a multi-but error is effected by the detecting circuit 4 and the analzying circuit 7 decides whether the error is in the data part or the check code part.

4-1, In case a single bit error is in the data part

Figure 5D:
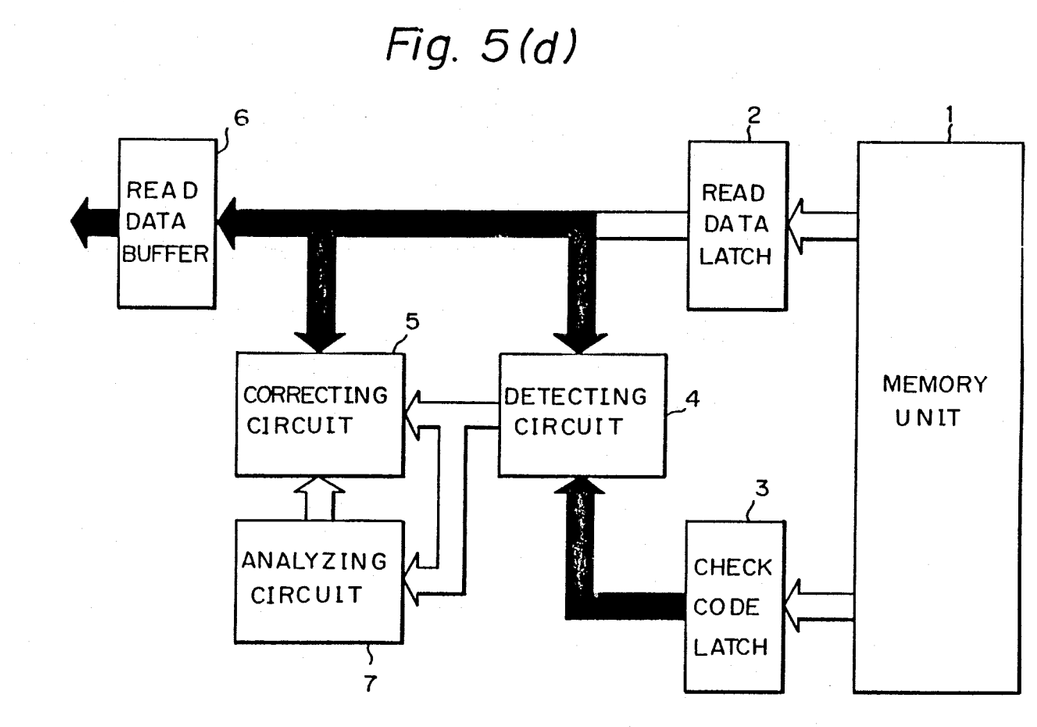

In case the error is in the data part, since the validity of the check code being latched in the check code latch 3 is assured, the correcting circuit 5 corrects the error by controlling from the analizing circuit 7 and sends the corrected data to the detecting circuit 4 and the read data buffer 6 as shown in FIG. 5(d). The detecting circuit 4 checks again the corrected data by using the check code latched in the check code latch 3 and if the corrected data is right, sends the corrected data latched in the read data buffer 6 to external devices.

4-2, In case a single bit error is in the check code part

Figure 5E:
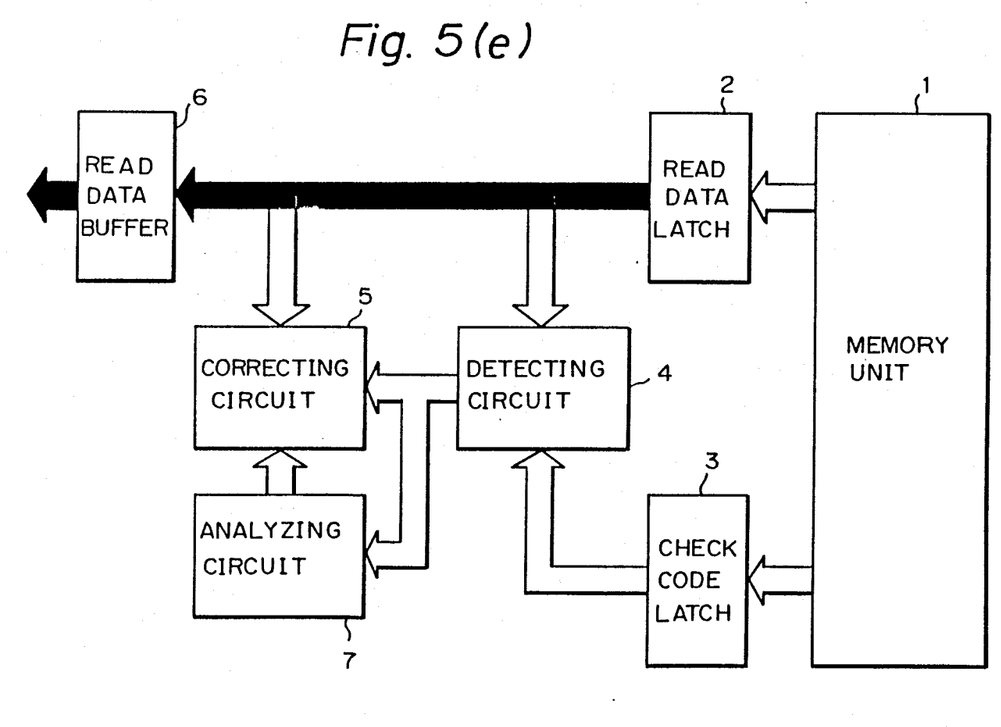

In case a single bit error is in the check code part, since the validity of the data read from the memory unit 1 being latched in the read data latch 2 is assured, the correcting circuit 5 does not effect the correcting function by controlling from the analyzing circuit 7 as shown in FIG. 5(e), the data latched in the read data latch 2 is sent to the read data buffer 6 and from which the data is sent to the external devices.

Figure 7A:
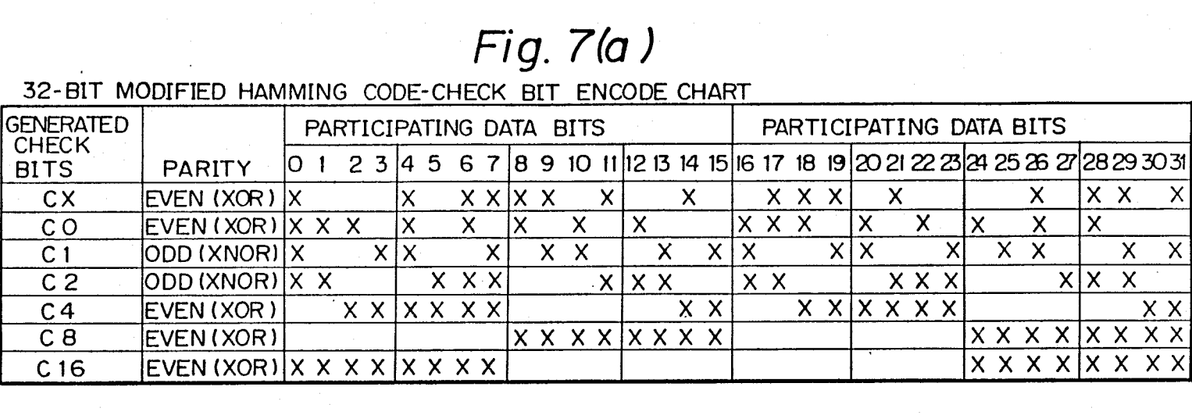
FIG. 7(a) and 7(b) show the pattern of generating the check codes.
Figure 7B:
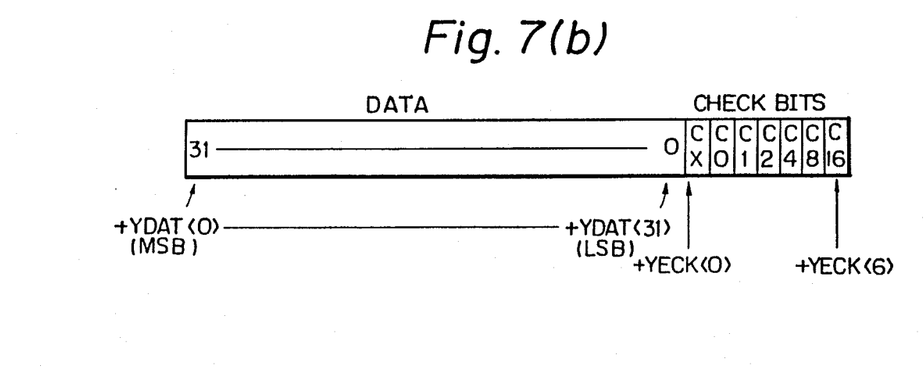

The check code is generated in accordance with the chart as shown in FIGS. 7(a) and 7(b), at the time to write the data into the memory unit.

Referring to FIG. 7(a), the check bits are constructed as total of 17 bits including 16 bits shown as "X" respectively and a check bit corresponding to the 16 bits having even or odd parity.

The allocation of the data and the check bits of FIG. 7(a) is shown in FIG. 7(b).

What is claimed is:

1. An error correction method for a memory system wherein a data word and a check code generated from information in said data word are written into a memory unit and subsequently read out of said memory unit and said check code is used to detect and correct at least one error in said data word, said error correcting method comprising the steps of:
    A. examining data word and check code information read from said memory unit and determining from said check code whether at least one error exists and whether said at least one error is correctable; and
    B. correcting said at least one error only when said at least one error is determined to exist in said data word and when said at least one error is determined to be correctable.

2. The error correction method of claim 1 further comprising the step of:
    C. re-examining a data word corrected in step B to determine if said at least one error still exists, and if said at least one error does not exist, outputting said corrected data word from said memory system.

3. The error correction method of claim 2 further comprising the step of:
    D. generating an error signal when it is determined that said at least one error is not correctable.

4. The error correcting method of claim 2 further comprising the step of:
    E. temporarily storing a data word read from said memory unit in a read data latch and temporarily storing a check code read from said memory unit in a check code latch.

5. The error correction method of claim 1 further comprising the step of:
    D. generating an error signal when it is determined that said at least one error is not correctable.

6. The error correcting method of claim 1 further comprising the step of:
    E. temporarily storing a data word read from said memory unit in a read data latch and temporarily storing a check code read from said memory unit in a check code latch.

7. An error correction method for a memory system wherein a data word and a check code generated from information in said data word are written into a memory unit and subsequently read out of said memory unit and said check code is used to detect and correct at least one error in said data word, said error correcting method comprising the step of:

A. examining data word and check code information read from said memory unit and determining from said check code whether at least one error exists and whether said at least one error is correctable;

B. correcting said at least one error only when said at least one error is determined to exist in said data word and when said at least one error is determined to be correctable;

C. re-examining a data word corrected in step B to determine if said at least one error still exists, and if said at least one error does not exist, outputting said corrected data word from said memory system;

D. generating an error signal when it is determined that said at least one error is not correctable; and E. temporarily storing a data word read from said memory unit in a read data latch and temporarily storing a check code read from said memory unit in a check code latch.

8. An error correction method for a memory system wherein a data word and a check code, generated from information in said data word, are written into a memory unit and subsequently read out of said memory unit and said check code is used to detect and correct at least one error in said data word, said error correcting method comprising the steps of:

A. separating said data word read from said memory unit from said check code read from said memory unit;

B. processing said read data word and said read check code so as to generate a syndrome code;

C. determining from the information in said syndrome code whether a bit error exists in said read data word or said read check code and whether said bit error is correctable;

D. analyzing said syndrome code to determine whether said correctable bit error exists in said read data word;

E. temporarily storing said read data word in a read data buffer upon determination in step D that said correctable bit error does not exist in said read data word;

F. correcting said correctable bit error in said read data word upon determination in step D that said correctable bit error exists in said read data word; and G. repeating steps B–E to determine if said correctable bit error in said corrected read data word has been corrected.

9. An error correction method for a memory system wherein a data word and a check code, generated from information in said data word, are written into a memory unit and subsequently read out of said memory unit and said check code is used to detect and correct at least one error in said data word, said error correcting method comprising the steps of:

A. separating said data word read from said memory unit from said check code read from said memory unit;

B. temporarily storing said read data word in a read data latch and temporarily storing said read check code in a check code latch;

C. processing said read data word and said read check code so as to generate a syndrome code;

D. detecting from the information in said syndrome code whether a bit error exists in said read data word or said read check code;

E. determining whether said bit error detected in step D is a single or multiple bit error;

F. activating an error signal upon determination in step E that said bit error is a multiple bit error;

G. analyzing whether said bit error detected in step D and determined as a single bit error in step E is positioned in said read data word or said read check code;

H. temporarily storing said read data word in a read data buffer upon determination in step G that said single bit errror does not exists in said read data word;

I. correcting the contents of said read data word upon determination in step G that said single bit error exists in said read data word; and J. reprocessing said corrected read data word and said read check code as characterized by steps C through H to determine if said single bit error has been corrected.

10. An error correcting memory system including a storage means for storing a plurality of digital data words and a plurality of check codes, each of said check codes corresponding to and generated from one of said data words, said check code containing information used to detect and correct errors in said corresponding data word, said memory system comprising:

error detecting means electrically connected to said storage means for processing one of said check codes and said corresponding data word read from said storage means, for detecting a bit error in said read data word for said read check code, and for determining whether said bit error is correctable;

analyzing means electrically connected to said detecting means for determining whether said correctable bit error exists in said read data word; and correcting means electrically connected to said analyzing means, said detecting means and said storage means for correcting said correctable bit error in said read data word.

11. The error correcting memory system of claim 10 further comprising a first and second latch means electrically connected to said storage means and said detecting means for temporarily storing said read data word and said read check code respectively.

12. The error correcting memory system of claim 11 wherein said detecting means further comprises means for generating an error signal upon determining that said bit error in said read data word is uncorrectable.

13. The error correcting memory system of claim 12 further comprising a buffer means electrically connected to said first latch means, said correcting means, and said detecting means, for temporarily storing said corrected read data word.

14. An error correcting memory system including a storage means for storing a plurality of digital data words and a plurality of check codes, each of said check codes corresponding to and generated from one of said data words, said check code containing information used to detect and correct errors in said corresponding data word, said memory system comprising:

a separating means electrically connected to said memory unit for separating said data word read from said memory unit from said check code read from said memory unit;

detecting means electrically connected to said separating means for processing said read data word and said read check code so as to generate a syndrome code, said detecting means further determining from the information in said syndrome code whether a bit error exists in said read data word or said read check code and whether said bit error is correctable;

analyzing means electrically connected to said detecting means for determining from said syndrome code whether said detected correctable bit error exists in said read data word;

correcting means electrically connected to said separating means, said detecting means, and said analyzing means, for correcting said detected correctable bit error in said read data word; and buffer means electrically connected to said separating means, said detecting means, and said correcting means, for temporarily storing said read data word prior to its output from said memory system.

15. The error correcting memory system, of claim 14 wherein said detecting means further comprises means for activating an error signal upon determination that said bit error is uncorrectable.

* * * * *